(12) United States Patent
Gaffney et al.

(10) Patent No.: US 12,463,959 B2
(45) Date of Patent: Nov. 4, 2025

(54) CLOUD-BASED SECRETS MANAGEMENT CREDENTIAL STORE

(71) Applicant: HashiCorp, San Francisco, CA (US)

(72) Inventors: Michael J. Gaffney, Perry Hall, MD (US); Todd Knight, Tucson, AZ (US); James Lambert, Milford, MA (US); Jeff Mitchell, Boston, MA (US); Louis Carl Ruch, Vashon, WA (US)

(73) Assignee: HashiCorp, San Francisco, CA (US)

( * ) Notice: Subject to any disclaimer, the term of this patent is extended or adjusted under 35 U.S.C. 154(b) by 392 days.

(21) Appl. No.: 17/837,976

(22) Filed: Jun. 10, 2022

(65) Prior Publication Data

US 2023/0403265 A1   Dec. 14, 2023

(51) Int. Cl.
*H04L 29/06* (2006.01)
*H04L 9/40* (2022.01)
*H04L 67/141* (2022.01)
*H04L 67/143* (2022.01)

(52) U.S. Cl.
CPC .......... *H04L 63/083* (2013.01); *H04L 63/101* (2013.01); *H04L 63/20* (2013.01); *H04L 67/141* (2013.01); *H04L 67/143* (2013.01)

(58) Field of Classification Search
CPC ..... H04L 63/083; H04L 63/101; H04L 63/20; H04L 67/141; H04L 67/143
See application file for complete search history.

(56) References Cited

U.S. PATENT DOCUMENTS

| 10,986,127 | B1* | 4/2021 | Sellers | H04L 41/40 |
| 2003/0220923 | A1* | 11/2003 | Curran | G06F 16/10 |
| 2005/0005094 | A1* | 1/2005 | Jamieson | H04L 63/0807 713/155 |
| 2010/0074261 | A1* | 3/2010 | Muhamed | H04L 12/4662 370/395.3 |
| 2012/0317261 | A1* | 12/2012 | Ahmavaara | H04L 67/141 709/223 |

(Continued)

FOREIGN PATENT DOCUMENTS

| WO | WO-2005048629 A1 * | 5/2005 | A45D 1/04 |
| WO | WO-2007041582 A1 * | 4/2007 | G06F 9/4443 |
| WO | WO-2023036128 A1 * | 3/2023 | G06F 16/13 |

*Primary Examiner* — Shawnchoy Rahman
(74) *Attorney, Agent, or Firm* — CANTOR COLBURN LLP; Stosch Sabo (57) ABSTRACT

A system and method for accessing and using one or more networked services of a cloud computing infrastructure by a user of a client computer includes an identity-based access management system that is configured to receive a request for a session via an API to use a specific service of the one or more networked services. A credential store includes a credential library that receives and stores credentials for authorizing and enabling the session with the specific service of the one or more networked services. A target service is configured to authorize and enable the session based on the received credentials. A secrets management system is configured to authenticate the user and the client computer to access and use the specific service authorized by the target service, and to generate a lease to a credential that is transmitted to the client computer to authorize the session with the specific service.

20 Claims, 3 Drawing Sheets

(56) References Cited

U.S. PATENT DOCUMENTS

| | | | |
|---|---|---|---|
| 2014/0068711 A1* | 3/2014 | Schweitzer, III | G06F 21/82 |
| | | | 726/3 |
| 2015/0280959 A1* | 10/2015 | Vincent | H04L 67/52 |
| | | | 709/203 |
| 2022/0191193 A1* | 6/2022 | Hamilton | H04L 63/029 |
| 2023/0403265 A1* | 12/2023 | Gaffney | H04L 63/101 |

* cited by examiner

CLOUD-BASED SECRETS MANAGEMENT CREDENTIAL STORE

TECHNICAL FIELD

The subject matter described herein relates to security for networked services of a cloud computing infrastructure, and more particularly to a credential store and a credential library for an identity-based access management system

BACKGROUND

In a system for managing identity-based access to computing resources, such as Boundary™ by HashiCorp Inc., a target is a set of configuration parameters representing a configuration of a networked service to which a user can connect and interact. This configuration specifies hosts, or sets of hosts ("host sets"), which in turn can be contained in a host catalog, and the hosts' network addresses that are considered equivalent from an access control perspective. These addresses, along with other protocol or address information contained in or referenced by the target, form a set of endpoints against which successful network connections can be initiated. A collection of these connections between a user and one or more hosts can be represented by a session. Such a session begins with an authorized user requesting access to a target and ends with a session termination event. Sessions may have time limits and may have connection count limits, both of which can be defined by the target.

Other systems, such as a centralized secrets management system like Vault™ by HashiCorp Inc., are configured for managing secrets and protecting sensitive data. Secrets can include, without limitation, tokens, passwords, certificates, and encryption keys. A secrets management system can provide functionality to dynamically create, revoke, and recycle credentials programmatically for a wide variety of networked services of an information technology platform, such as applications provided on a cloud computing infrastructure.

Connecting to a networked service often requires credentials for authentication and authorization. For example, a financial analyst might require access to their company's sales database to create a monthly report. When the analyst wants to create the report, they often need database credentials, which their reporting tool can use to connect to the sales database and run the report. In this example, the analyst may only need credentials for access to the sales database once a month, and only for a limited amount of time.

A traditional workflow for an access management system requires the user to obtain a credential from a secrets management system such as Vault™ and provide it to the networked service once an authorized session is established via a system like Boundary™. To do so, the user must authenticate to the secrets management system, be authorized to obtain the credential, and acquire it. This process is inefficient, time-consuming, resource-intensive, and operationally burdensome for regular and repeated access to networked services such as the sales database. Additionally, it has a wide attack surface from a security standpoint due to every user having access to the secrets management system.

Another traditional workflow for an access management system allows storing secrets and credentials, such as username/password combinations or cryptographic certificates, directly within the access management system. When the user requests access to a networked service such as the sales database, these secrets or credentials can be injected into the session on behalf of the user. This provides additional security compared to the previous method since the user does not need to access the secrets management system, but management of the credentials becomes a complex task, as following best security practices requires frequent auditing and rotation of the secrets. Additionally, if a secret is accidentally or maliciously divulged from the access management system or the networked service, the secret is now compromised for all sessions created to that networked service.

SUMMARY

This document presents a credential store and a credential library for an identity-based access management system. In some aspects, the credential store and credential library are specific to a secrets management system that generates the credentials for access to a networked service. The credential store and credential library provide a dynamic approach to providing credentialed access to networked services, whereby credentials can be obtained from multiple credential sources, and generated on-the-fly dynamically from any of these sources, and which streamlines the use of credentialing for safe and secure access to networked services.

In one aspect, a dynamic credentialing system for accessing and using one or more networked services of a cloud computing infrastructure by a user of a client computer is described. The system includes an identity-based access management system accessible by the client computer via an application programming interface (API). The identity-based access management system is configured to receive a request for a session via the API to use a specific service of the one or more networked services. The identity-based access management system has a credential store that includes a credential library that receives and stores credentials for authorizing and enabling the session with the specific service of the one or more networked services, and further includes a target service configured to authorize and enable the session based on the received credentials. The dynamic credentialing system further includes a secrets management system configured to authenticate the user and/or the client computer to access and use the specific service authorized by the target service of the identity-based access management system. The secrets management system is configured to generate a lease to a credential that is transmitted to the client computer to authorize and enable the session with the specific service of the one or more networked services of the cloud computing infrastructure.

In other aspects, a method and computer program product includes steps or operations to receive, via an application programming interface (API) accessible by the client computer, a request for a session to use a specific service of the one or more networked services, the request being received by an identity-based access management system having a credential store that includes a credential library that receives and stores credentials for authorizing and enabling the session with the specific service of the one or more networked services. The steps or operations further include operations to authorize the session based on the received credentials, authenticate the user and/or the client computer to access and use the specific service authorized by the target service of the identity-based access management system, and generate a lease to a credential that is transmitted to the client computer to authorize and enable the session with the specific service of the one or more networked services of the cloud computing infrastructure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a cloud-based secrets management credential store, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a credential store and credential library for an identity-based access management (IBAM) system. In some aspects, the credential store and credential library are specific to one or more secrets management systems that generate the credentials for access to a networked service.

A credential store is a resource that can interact with other resources, such as host catalogs and targets. A secrets management system, such as Vault™ by HashiCorp, is one type of credential store, although an IBAM system such as Boundary™ can support multiple types of credential stores, each providing their own unique credentials. A credential store can also be a representation of a secrets management system to access resources and services of a secrets management system across a network connection. Further, a secrets management system can be a native feature of an IBAM system.

The credential store and the credential library each have basic create, read, update and delete (CRUD) operations similar to other resources. Alternatively, a user can also list credential stores and credential libraries within a scope, i.e., a resource to group other resources. As an example, the credential store and credential library can have the following CRUD operations:

Credential Store Service
    Create
        POST/v1/credential-stores?scope_id=p_1234567890
        The body of the request is the credential store with the attributes set as desired.
    Update
        PATCH/v1/credential-stores/csvlt_1234567890
        The body of the request are the fields to mutate.
    Read
        GET/v1/credential-stores/csvlt_1234567890
    Delete
        DELETE/v1/credential-stores/csvlt_1234567890
Credential Library Service
    Create
        POST/v1/credential-libraries?scope_id=p_1234567890
        The body of the request is the credential library with the attributes set as desired.
    Update
        PATCH/v1/credential-libraries/clvlt_1234567890
        The body of the request are the fields to mutate.
    Read
        GET/v1/credential-libraries/clvlt_1234567890
    Delete
        DELETE/v1/credential-libraries/clvlt_1234567890

Credential stores are analogous to host catalogs. Credential stores may contain any number of credential libraries (analogous to host sets), and credential libraries contain credentials for hosts. Each credential store holds information about the store itself, for instance, authentication information to a cloud service, such as a Vault address and token, for example. Credential libraries contains configuration for pulling some specific type of secrets from the cloud service. As an example, one credential library can be configured to fetch SSH keys from Vault, and another library can be configured to fetch PKI certificates from Vault, and by having both libraries in the same credential store they can share the overall Vault configuration/authentication information. Accordingly, credentials themselves are a part of the domain model.

Figure 1:
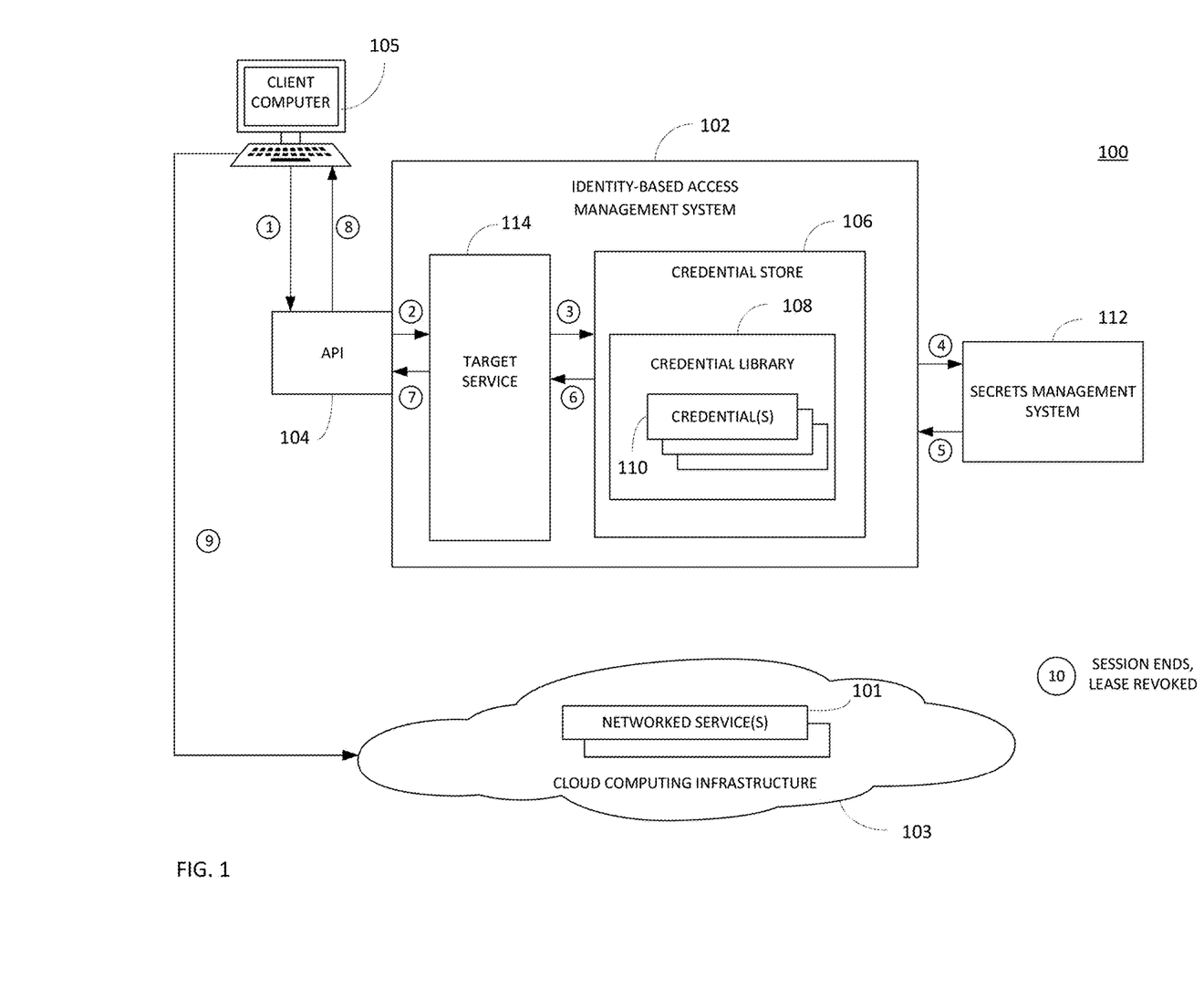
FIG. 1 illustrates a dynamic credentialing system for accessing and using one or more networked services of a cloud computing infrastructure by a user of a client computer, consistent with implementations of the current subject matter.

FIG. 1 illustrates a dynamic credentialing system 100 for accessing and using one or more networked services 101 of a cloud computing infrastructure 103 by a user of a client computer 105. In order to access and use a networked service 101, the user of the client computer 105 needs to seek authentication and authorization by the system 100 to a target service 114, which creates/authorizes sessions of a networked service. The authentication and authorization can be done via a credential that authenticates and validates the user's identity, qualifications, access permissions, and authorizations and the like.

The system 100 includes an identity-based access management (IBAM) system 102 that communicates with the client computer 105 via an application programming interface (API) 104. The IBAM system 102 includes a credential store 106 having a credential library 108. The credential library 108 stores one or more credentials 110 provided by, or leased from by a process described below, a secrets management system 112. The secrets management system 112 generates, controls, encrypts, and securely protects various sensitive user-related data, such as access tokens, passwords, certificates, encryption keys and, as described above, access credentials for accessing target network services.

The IBAM system 102 acts as a broker, using a brokering process on behalf of each client computer 105, to access and utilize a credential 110 from the credential library 108 of the credential store 106 to authorize and validate the client computer 105 to access and use the one or more networked services 101 on the cloud computing infrastructure 103.

With sufficient permissions, a user of the client computer 105 can browse the credential store 106, as well as create, update, and delete credential stores 106 using the IBAM system 102. Further, a user can browse credentials 110 within the credential library 108. Note that credentials 110 can be dynamically generated and managed by the secrets management system 112. In some implementations, there are no direct operations that may be performed on individual credentials 110. However, users can cancel a session associated with any particular credential 110. A user can further navigate to a session associated with a given credential 110, as well as credential libraries 108 associated with a target service 114.

With reference to FIG. 1, a process for dynamic credentialing, for accessing and using one or more networked services 101 of a cloud computing infrastructure 103 by a user of a client computer 105 can be described. At 1, the client computer 105 sends a request to the IBAM system 102, at 2, via the API 104 to authorize a session to use a networked service 101. The request includes an identification of a target service 114, which stores a list of networked services 101 that are accessible by the user of the client computer 105. The target service 114 is associated with the credential library 108, which is owned by the credential store 106, and which is connected with the credential store 106 to create/authorize sessions. Once the session is created and authorized, the target service 114 forwards the authorized session at 3 to the credential store 106 and the credential library 108, which is configured to perform a lookup for a credential from the secrets management system 112.

The credential store 106 is pre-configured with credentials sufficient to access the secrets management system 112 through the API 104. A token can be used by the credential store's 106 credential library 108 when retrieving credentials 110 from the secrets management system 112. The token associated with the credential store 106 may have a time-based expiration, and if so, is preferably configured to be long-lived or renewed periodically. If the token expires, all calls to retrieve credentials 110 from one of its credential libraries 104 will return an error.

Each credential store 106 provides a unique set of access parameters or authentication and authorization parameters (credentials, certificates, etc.) for access to the secrets management system 112. The lifecycle of the token is tied to the lifecycle of the credential store 106 that owns it. When a credential store 106 is deleted, it is "soft" deleted, and once all sessions have been terminated that have credentials associated with that token, the IBAM system 102 calls the secrets management system 112 and revokes the token of the credential store 106 and "hard" deletes it. If the secrets management system 112 revokes a token, it also revokes any credentials 110 created using that token. If multiple credential stores 106 are allowed to use the same token, the deletion of one credential store 106 may unexpectedly cause errors in any credential store 102 using the same token. A single periodic job renews all credential store tokens. This job uses an internal job scheduling package to minimize the load on the secrets management system 112.

Figure 2:
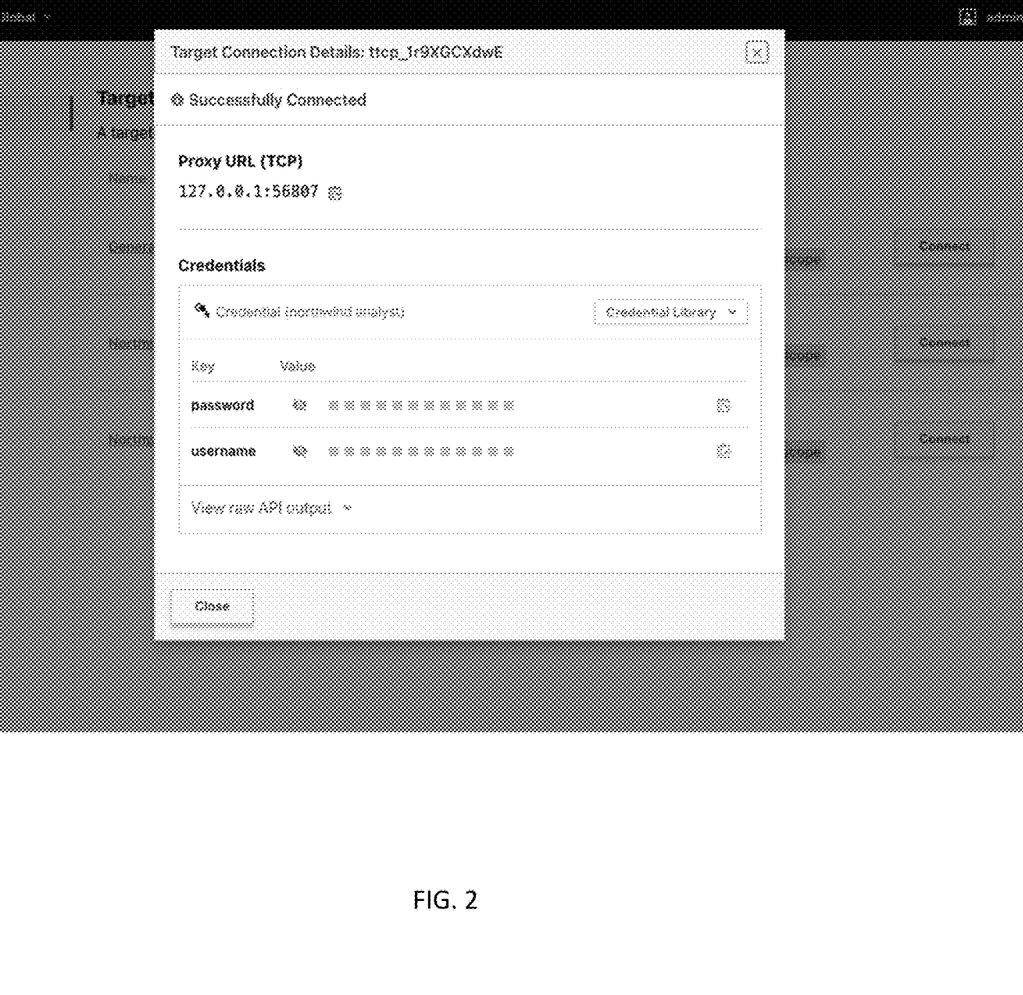
FIG. 2 shows an example of credentials displayed to an end user via a client computer.

Credentials 110, if configured for a target service 114 associated with a networked service 101, are returned to the client computer 105 immediately prior to connection by the client computer 105 with the cloud computing infrastructure 103, in order to be used as part of that connection for authentication and other security needs. In some implementations, an initial experience can include displaying credentials 110 selected by the IBAM system 102 to end users, after the connection has been created with the networked service(s), as shown in FIG. 2. Users may then copy the credentials 110 from the client computer 105 and apply them as needed to their workflow, i.e., in collaboration with other client computers. Credentials 110 can also be displayed on a new session detail page displayed by each client computer 105 for reference by the end user.

When a user specifies a target service 114, the IBAM system 102 at 4 retrieves, or "leases" a session credential 110 from the secrets management system 112, which is stored in the credential library 108 associated with the target service 114 at 5. The IBAM system 102 stores any data needed for managing the lease of the credential 110 in the credential store 106 and returns the actual credentials 110 at 6 to the client computer 105 via the API 104 at 7 and 8. At 9, the client computer 105 is then authorized and credentialed to access the networked services 101 in the cloud computing infrastructure 103.

In some implementations, the IBAM system 102 does not store or log the actual credentials 110 returned from the secrets management system 112. When a session is terminated, the IBAM system 102 can revoke all leases associated with the session, at 10. Leases for all active sessions can be renewed by a single periodic job in order to keep them valid for the lifetime of the client computer's 105 connection to the cloud computing infrastructure 103. This job can use the internal job scheduling package to minimize the load on the secrets management system 112.

Accordingly, instead of needing to decode the network stream and then terminate the connection from the client computer 105 in a proxy worker and then continually create a credential for each session, as described herein, a credential can be "leased" to a client computer 105, and the credential or its metadata that is sufficient for lease or other management is stored in the credential library 108 until revoked, usually after the session ends.

As illustrated in FIG. 2, the system 100 can provide a web UI, desktop client, and/or command line interface (CLI) for the client computer 105 to display a message to the user when they successfully connect to a target networked service 101. This display message includes the credentials 110 returned from the credential library 108 associated with the target service 114.

Figure 3:
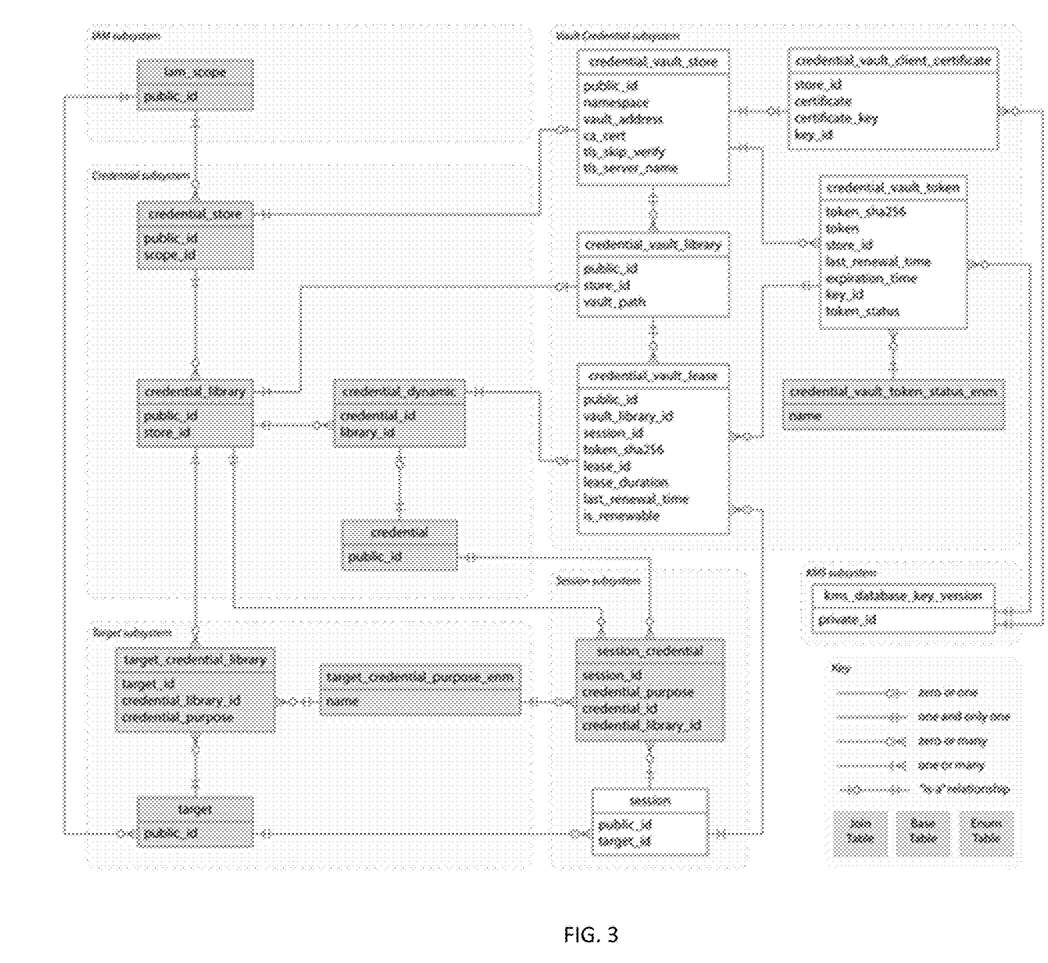
FIG. 3 illustrates tables for a secrets management system credentialing subsystem, consistent with implementations of the current subject matter.

FIG. 3 illustrates one implementation of tables for a secrets management system credentialing subsystem, consistent with a number of implementations of the current subject matter. New tables to implement the subject matter described herein can include, without limitation, and using a secrets management system such as Vault™ by HashiCorp® as an example:

credential_vault_store is a table where each row is a resource that represents a vault credential store. It is a credential_store_subtype. It contains attributes for connecting to a secrets management system cluster.

credential_vault_library is a table where each row is a resource that represents a credential library. It is a credential_library subtype and a child table of credential_vault_store. It contains attributes for retrieving credentials from a secrets management system backend.

credential_vault_token is a table where each row contains a token for one credential store.

credential_vault_token_status_enm is an enumeration table for the status of vault tokens. It contains rows for representing the current, maintaining, revoked, and expired statuses.

credential_vault_client_certificate is a table where each row contains a client certificate that a credential_vault_store uses for connecting to a secrets management system. A credential_vault_store can have 0 or 1 client certificates.

credential_vault_lease is a table where each row contains the lease information for a single credential retrieved from a credential library for a session. It is a credential_dynamic subtype and a child table of credential_vault_library.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A dynamic credentialing system for accessing and using one or more networked services of a cloud computing infrastructure by a user of a client computer, the accessing and using being enabled by one or more secrets accessed from a secrets management system, the dynamic credentialing system comprising:
an identity-based access management system accessible by the client computer via an application programming interface (API), the identity-based access management system comprising a non-transitory machine-readable medium storing instructions that, when executed by at least one processor, cause the processor to receive a request for a session via the API to use a specific service of the one or more networked services, the identity-based access management system having a target service configured to receive the request, the identity-based access management system further comprising a credential store that includes a credential library that receives and stores credentials for authorizing and enabling the session with the specific service of the one or more networked services via a lease generated by the secrets management system to one or more credentials based on the one or more secrets accessed from the secrets management system, the target service being further configured to receive the authorizing credentials and forward the credentials to the client computer via the API to enable the client computer to access and use the one or more networked services of the cloud computing infrastructure for the session,
wherein the identity-based access management system is further configured such that only lease metadata for the credential is retained by the identity-based access management system, and
wherein an internal scheduler of the identity-based access management system is configured to periodically renew the lease for the credential while the session is active, and wherein, upon termination of the session, the identity-based access management system is further configured to programmatically call the secrets management system to revoke the lease for the credential.

2. The system in accordance with claim 1, wherein the identity-based access management system is further configured to create, update, read and delete the credential store.

3. The system in accordance with claim 1, wherein the identity-based access management system is further configured to browse a plurality of credentials stored in the credential library.

4. The system in accordance with claim 1, wherein the target service authorizing the client session with the specific service results in a credential being retrieved by the target service from the secrets management system.

5. The system in accordance with claim 4, wherein the identity-based access management system is further configured to impose a time limit for the session.

6. The system in accordance with claim 4, wherein the identity-based access management system is further configured to impose a connection count limit for the session.

7. A method of credentialing, accessing and using one or more networked services of a cloud computing infrastructure by a user of a client computer, the method comprising:
receiving, an identity-based access management system accessible by the client computer via an application programming interface (API), a request for a session to use a specific service of the one or more networked services, the identity-based access management system having a credential store that includes a credential library that receives and stores credentials for authorizing and enabling the session with the specific service of the one or more networked services;
authorizing, by a target service of the identity-based access management system, the session based on the received credentials;
receiving, from a secrets management system associated with the identity-based access management system, an authentication for the user and the client computer to access and use the specific service authorized by the target service of the identity-based access management system; and
accessing, by the identity-based access management system, a lease generated by the secrets management system to a credential that is transmitted to the client computer to authorize and enable the session with the specific service of the one or more networked services of the cloud computing infrastructure,
wherein the identity-based access management system is further configured such that only lease metadata for the credential is retained by the identity-based access management system, and
wherein an internal scheduler of the identity-based access management system is configured to periodically renew the lease for the credential while the session is active, and wherein, upon termination of the session, the identity-based access management system is further configured to programmatically call the secrets management system to revoke the lease for the credential.

8. The method in accordance with claim 7, wherein the identity-based access management system is further configured to create, update, read and delete the credential store.

9. The method in accordance with claim 7, wherein the identity-based access management system is further configured to browse a plurality of credentials stored in the credential library.

10. The method in accordance with claim 7, wherein the target service authorizing the client session with the specific service results in a credential being retrieved by the target service from the secrets management system.

11. The method in accordance with claim 10, wherein the identity-based access management system is further configured to impose a time limit for the session.

12. The method in accordance with claim 10, wherein the identity-based access management system is further configured to impose a connection count limit for the session.

13. A computer program product comprising a non-transitory machine-readable medium storing instructions that, when executed by one or more programmable processors, cause the one or more programmable processors to perform operations to credential, access and use one or more networked services of a cloud computing infrastructure by a user of a client computer, the operations comprising:
receive, via an application programming interface (API) accessible by the client computer, a request for a session to use a specific service of the one or more networked services, the request being received by an identity-based access management system having a credential store that includes a credential library that receives and stores credentials for authorizing and enabling the session with the specific service of the one or more networked services;

authorize the session based on the received credentials;
authenticate the user and the client computer to access and use the specific service authorized by the target service of the identity-based access management system; and
generate a lease to a credential that is transmitted to the client computer to authorize and enable the session with the specific service of the one or more networked services of the cloud computing infrastructure,
wherein the identity-based access management system is further configured such that only lease metadata for the credential is retained by the identity-based access management system, and
wherein an internal scheduler of the identity-based access management system is configured to periodically renew the lease for the credential while the session is active, and wherein, upon termination of the session, the identity-based access management system is further configured to programmatically call a secrets management system to revoke the lease for the credential.

14. The computer program product in accordance with claim 13, wherein the identity-based access management system is further configured to create, update, read and delete the credential store.

15. The computer program product in accordance with claim 13, wherein the identity-based access management system is further configured to browse a plurality of credentials stored in the credential library.

16. The computer program product in accordance with claim 13, wherein the target service authorizing the client session with the specific service results in a credential being retrieved by the target service from the secrets management system.

17. The computer program product in accordance with claim 16, wherein the identity-based access management system is further configured to impose a time limit for the session.

18. The computer program product in accordance with claim 16, wherein the identity-based access management system is further configured to impose a connection count limit for the session.

19. The system of claim 1, wherein the credentials leased from the secrets management system comprise application-layer secrets selected from the group consisting of passwords, API tokens, and cryptographic certificates, each of which is dynamically generated by the secrets management system and is valid only for a duration of a requested service session.

20. The system of claim 1, wherein the identity-based access management system is further configured to store, for each credential store, a long-lived access token for authenticating to the secrets management system, and wherein the access token is periodically renewed by the identity-based access management system while the credential store exists, and is revoked upon deletion of the credential store.

* * * * *